United States Patent Office 3,265,579
Patented August 9, 1966

3,265,579
PROCESS FOR PURIFICATION OF BOVINE
GROWTH HORMONE
Edward G. Daniels and Alan J. Parcellas, Portage, Mich.,
assignors to The Upjohn Company, Kalamazoo, Mich.,
a corporation of Delaware
No Drawing. Filed Jan. 8, 1964, Ser. No. 336,373
1 Claim. (Cl. 167—74)

This invention relates to a process of purifying products of glandular origin, more particularly, a process of purifying bovine growth hormone.

The presence of biologically inert or relatively inert contaminants, especially those of protein nature, in extracts of bovine pituitary glands is a matter of serious consequence. Such contaminants and biologically inert proteins reduce the specific biological activity of the hormone, that is, the biological response to a given dosage by weight. Aside from possibly causing undesirable immunological responses, nonspecific contaminants and proteins represent otherwise undesirable metabolites and products of glandular origin.

The novel process of the present invention provides an improved process of increasing the specific activity of bovine growth hormone. As stated heretofore, the specific activity is that biological response provided by a given dosage by weight. The present invention also provides an essentially homogeneous protein with a high quality of biological activity as measured by somatotrophic responses.

The present process provides novel products with somatotrophic responses which are useful in the treatment of pituitary insufficiency in animals or in circumstances wherein hypophysectomy has been performed. The products provide also purified material for chemical degradation and modification studies.

Generally described, the inventive process entails the purification of bovine growth hormones of mixed and relatively impure composition by exclusion chromatography over cross-linked gels. Art known bovine growth hormones can be utilized as starting materials, for example, those prepared according to the methods of Wilhelmi, J. Biol. Chem., 176, 737 (1948), and Li, J. Biol. Chem., 211, 555 (1954). Cross-linked dextran gels, cross-linked agar gels, and cross-linked polyacrylamide gels can be used. Such gels are essentially cross-linked and capable of absorbing water with swelling. Operable cross-linked gels are those with a water regain of about 7.5 grams per gram of dry weight. Water regain values are determined according to the methods of Per Flodin, "Dextran Gels and Their Applications," Meijels Bokindustri, Halmstad, Sweden, 1962. A particularly advantageous gel is the cross-linked dextran gel known as Sephadex G–75 available commercially from Pharmacia Fine Chemicals Incorporated, Rochester, Minnesota, U.S.A. The exclusion chromatography columns can be prepared from the cross-linked gel equilibrated with aqueous solutions on either the alkaline or acidic side of neutrality, for example, sodium bicarbonate solution, dilute hydrochloric acid solution, dilute acetic acid solution, and the like. Slightly acidic solutions are preferred. Solutions of starting bovine growth hormone are prepared in the respective aqueous solutions, applied to the previously equilibrated columns, and the columns are eluted with the respective alkaline or acidic aqueous solutions. As the protein components of the starting materials are eluted from the column, they are followed by ultraviolet spectrophotometry at 280 m$\mu$ and by biological assays. Suitable eluate fractions are collected and combined as indicated by the spectrophotometry and biological assays to provide active eluates. These are dialyzed against purified water U.S.P. and dried, preferably by drying from the frozen state to yield the purified bovine growth hormone protein material.

Temperature conditions are not critical; however, temperatures of from about 5° C. to about 25° C. are preferred. The concentration of solutions applied to the gel should be near the maximum to avoid excessive volumes of solvent. However, more dilute solutions are operable. The flow rate over the gel is not critical. Flow by gravity is satisfactory.

The following examples set forth how to perform the inventive process and the best mode contemplated of carrying out the invention but are not to be construed as limiting.

Example 1

A column (1.8 x 60 cm.) of a cross-linked dextran gel having a water regain value of 7.5 gm./gm. dry weight (Sephadex G–75) was poured to a total volume of 150 ml. The gel had been previously equilibrated with a 0.1 M $NaHCO_3$ buffer, pH 9.4. Forty mg. of bovine growth hormone, prepared by the Wilhelmi procedure, was dissolved in 4 ml. of the bicarbonate buffer. The pH of the protein solution was readjusted with NaOH to 9.4 and 3 ml. of it applied to the column. Elution was started with the pH 9.4 buffer at about 10° C., the first 36 ml. being discarded. Two ml. fractions were then collected in test tubes. The combined content of the first four tubes was designated 90.1 and that of tubes 6 to 16, 90.2. The respective contents were separately dialyzed against cold deionized water and lyophilized. Fraction 90.2 was found to be active for growth hormone activity by the radio-sulfate-uptake assay.

Example 2

A column of a cross-linked dextran gel with a water regain of 7.5 gm./gm. dry weight (Sephadex G–75, Pharmacia Fine Chemicals, Inc., Rochester, Minnesota) and having a particle size of 100–270 mesh, was poured to the dimensions of 4.8 x 100 cm. The gel had been equilibrated with 0.1 N acetic acid (pH 3.5). Eight hundred mg. of bovine growth hormone number 72 prepared by the Wilhelmi procedure was dissolved in 60 ml. of 0.1 N acetic acid and applied to the column. The protein was eluted with the dilute acetic acid, 15-ml. fractions being collected in test tubes in an automatic fraction collector. The contents of tubes 32 to 48 were pooled as fraction 10.1, tubes 49 to 64 as 10.2, tubes 65 to 86 as 10.3 and tubes 87 to 101 as 10.4. Each fraction was dialyzed (Visking cellulose tubing, $^{30}\!/_{32}$") against cold, purified water and lyophilized to furnish the following yields: 10.1, 269 mg.; 10.2, 79.6 mg.; 10.3, 105 mg. and 10.4, 167.6 mg. Biological assay by the radio-sulfate uptake method, Collins et al., Acta Endocrinologica, 36, 51 (1961), gave the following results:

| Sample | No. of Rats | Dose/Rat, $\mu$g. | Counts per Minute |
|---|---|---|---|
| Control | 7 | | 23.4 |
| 72 (Starting material) | 7 | 24 | 48.5 |
| 10.1 | 8 | 24 | 25.9 |
| 10.2 | 8 | 24 | 29.0 |
| 10.3 | 8 | 24 | 40.9 |
| 10.4 | 7 | 24 | 46.6 |

Similar results are obtained using cross-linked agar gels and cross-linked polyacrylamide gels having a water regain value of about 7.5 gm. per gm. of dry weight.

Example 3

A 1.9 x 100 cm. column of Sephadex G-75 was poured. The gel had been equilibrated with 0.001 N hydrochloric acid containing 0.2 N sodium chloride (pH 3.0). Fifty-eight mg. of bovine growth hormone number 98 prepared by the Wilhelmi method was dissolved in 4 ml. of 0.001 N hydrochloric acid. The turbid protein solution was clarified by the addition of solid sodium chloride. The sample was applied to the column and eluted with the acid-salt solution in the cold, collecting 3-ml. fractions. Two peaks were detected by ultraviolet spectrophotometry at 280 m$\mu$. Suitable cuts were made, the fractions adjusted to pH 10 with 1 N NaOH, dialyzed and lyophilized. Biological assay by the radio-sulfate assay gave the following results:

| Sample | No. of Rats | Dose/Rat, $\mu$g. | Counts per Minute |
|---|---|---|---|
| Control | 7 | | 46.0 |
| 130.1 | 8 | 24 | 58.6 |
| 130.2 | 8 | 24 | 87.4 |

Example 4

800 mg. of low biological titer bovine growth hormone number 147 was dissolved in 40 ml. of 0.1 N acetic acid. The protein solution was applied to a 3.8 x 90 cm. column of Sephadex G-75, 50-140 mesh, which had been equilibrated with 0.1 N acetic acid. The column was eluted with this dilute acid solution, collecting 9-ml. fractions. The run was performed at about 50° C. The effluent run was monitored by measuring the optical density at 280 m$\mu$ of tubes at points of inflection:

| Tube No. | Optical Density, m$\mu$ | Tube No. | Optical Density, m$\mu$ |
|---|---|---|---|
| 21 | 0.112 | 42 | .357 |
| 22 | .618 | 43 | .405 |
| 30 | 1.250 | 44 | .440 |
| 31 | 1.06 | 52 | 1.210 |
| 36 | 0.408 | 60 | 0.293 |
| 37 | .375 | 61 | .195 |
| 38 | .352 | 62 | .131 |
| 39 | .352 | 65 | .043 |
| 40 | .352 | 66 | .035 |
| 41 | .357 | 67 | .029 |

The contents of tubes 21 to 40 were pooled as 89.1 and tubes 41 to 65 were pooled as 89.2. Fraction 89.1 was lyophilized directly to yield 378.3 mg. Fraction 89.2 was dialyzed against 0.005 M ammonium hydroxide in the cold and then lyophilized to yield 385.3 mg. When 89.2 was assay against a U.S.P. standard it was found to be fully active by the tibia test.

Example 5

Two 800 mg. portions of low biological titer bovine growth hormone, Number 147, were purified in similar manner over a like column, using 0.1 N acetic acid. The combined dried products were subjected to rechromatography under like conditions. 666 mg. was recovered as product 132.2.

Example 6

Two additional 800 mg. portions of product 147 were processed in a similar manner to Example 5. The combined dried products were rechromatographed. 500 mg. was recovered as product 141.2.

The products of Example 5 and 6 were assayed biologically with the following results:

ASSAY OF BOVINE GROWTH HORMONE BY THE TIBIA TEST

| Sample | No. of Rats | Dose/Rat ($\mu$g.) | Tibia Width, micra |
|---|---|---|---|
| Control | 3 | | 179 |
| USP Standard | 6 | 20 | 222 |
| USP Standard | 5 | 80 | 281 |
| 147 (starting material) | 6 | 20 | 239 |
| 147 | 6 | 80 | 284 |
| Control | 7 | | 180 |
| Standard | 7 | 20 | 191 |
| Standard | 7 | 320 | 257 |
| 141.2 | 7 | 20 | 212 |
| 141.2 | 7 | 320 | 344 |

ASSAY OF BOVINE GROWTH HORMONE BY RADIOSULFATE-UPTAKE

| Sample | No. of Rats | Dose/Rat ($\mu$g.) | CPM/mg. |
|---|---|---|---|
| Control | 7 | | 56.9 |
| Standard | 6 | 24 | 85.5 |
| 132.2 | 7 | 12 | 96.8 |
| 141.2 | 7 | 12 | 71.1 |
| 141.2 | 7 | 24 | 113.7 |

A column of cross-linked dextran gel was poured to a final dimension of 2.8 x cm. x 101 cm. The gel had a water regain value of 10 gm./gm. of dry weight and a particle size of 140-400 mesh (Sephadex G-100). The gel had been equilibrated against a 0.1 M potassium phosphate buffer of pH 6.7, containing 0.5 M sodium chloride. 200 mg. of bovine growth hormone which had been previously chromatographed over Sephadex G-75 was dissolved in 35 mls. of this buffer. Essentially one symmetrical peak was recovered from the eluate of the Sephadex G-100 chromatogram. This recovered material was studied by ultracentrifugal analysis (Beckman/Spinco Model E) and showed a single peak. The sedimentation study was performed with a 1% solution in 0.1 M sodium carbonate at 50° bar angle, 50,740 r.p.m. 25° C.

The purified bovine growth hormone was examined by the "paper-DNP" method of Levy and the carboxypeptidase procedure of Harris, Fraenkel-Conrat, H., Harris, J. I., and Levy A. L., in "Methods of Biochemical Analysis" (D. Glick, ed.) 2, p. 359, Interscience, New York, 1955. Alanine and phenylalanine were identified as their dinitrophenyl derivatives, thus confirming their position on the nitrogen terminus position. After digestion with carboxypeptidase, phenylalanine was found to be the first amino acid to be liberated in stoichiometric yield, confirming its position on the carboxyl terminus.

In contrast to the analytical tests of the recovered high quality growth hormone, similar tests of the recovered inactive protein portion of starting materials showed that portion to be devoid of both nitrogen and carboxyl terminal amino acids. Hence, differences in both biological activity and chemical characterization exist in the products separated by the novel chromatography process.

What is claimed is:

A process of purifying bovine growth hormone which comprises:
(1) applying an aqueous solution of bovine growth hormone to a cross-linked gel having a water regain value of about 7.5 gm. of water per gm. of dry gel to prepare a chromatogram,
(2) eluting said chromatogram with an aqueous solution and collecting fractional eluates therefrom,
(3) combining somatotrophic eluates which absorb ultraviolet light of about 280 m$\mu$,
(4) recovering purified bovine growth hormone by diadlyzing the combined eluates.

No references cited.

JULIAN S. LEVITT, *Primary Examiner.*

LEROY B. RANDALL, *Assistant Examiner.*

UNITED STATES PATENT OFFICE
CERTIFICATE OF CORRECTION

Patent No. 3,265,579                           August 9, 1966

Edward G. Daniels et al.

It is hereby certified that error appears in the above numbered patent requiring correction and that the said Letters Patent should read as corrected below.

In the heading to the printed specification, line 4, for "Alan J. Parcellas" read -- Alan J. Parcells --.

Signed and sealed this 22nd day of August 1967.

(SEAL)
Attest:

ERNEST W. SWIDER                          EDWARD J. BRENNER
Attesting Officer                                Commissioner of Patents